United States Patent [19]

Pölling

[11] Patent Number: 5,086,905
[45] Date of Patent: Feb. 11, 1992

[54] TIPPING-CONVEYOR ELEMENT FOR A PACKAGE CONVEYOR

[75] Inventor: Ludger Pölling, Wadersloh Diestedde, Fed. Rep. of Germany

[73] Assignee: Bernhard Beumer Maschinenfabrik KG, Beckum, Fed. Rep. of Germany

[21] Appl. No.: 494,411

[22] Filed: Mar. 16, 1990

[30] Foreign Application Priority Data

Mar. 16, 1989 [DE] Fed. Rep. of Germany ....... 3908632

[51] Int. Cl.$^5$ .............................................. B65G 47/46
[52] U.S. Cl. ..................................... 198/365; 198/802; 198/477.1
[58] Field of Search ....................... 198/365, 477.1, 802

[56] References Cited

U.S. PATENT DOCUMENTS

| | | | |
|---|---|---|---|
| 4,004,681 | 1/1977 | Clewett | 198/365 |
| 4,413,721 | 11/1983 | Bollier | 198/365 |
| 4,729,466 | 3/1988 | Bollier et al. | 198/365 |
| 4,744,454 | 5/1988 | Polling | 198/365 |
| 4,793,462 | 12/1988 | McFall | 198/365 |

Primary Examiner—Joseph E. Valenza
Attorney, Agent, or Firm—Oblon, Spivak, McClelland, Maier & Neustadt

[57] ABSTRACT

A tipping-conveyor element for a package conveyor, having a driven conveyor line which includes a multiplicity of conveyor elements flexibly connected to one another, elements on whose carrying surface, essentially horizontal in the conveying state, there is to be placed in each case at least one package which, by tipping the carrying surface, is to be delivered, laterally to the conveying direction, selectively to one of several delivery stations provided along the conveying track, with a carrying element exhibiting the carrying surface, an element that is braced by a support device on a support part that is movable along a guideway, wherein the carrying element is provided with a pivoted journal placed stationary on its underside, oriented downward at an incline, and can pivot around the lengthwise axis of the journal during tipping, and the journal is supported on a tipping element which, for its part, is further mounted on a support element projecting upward from the support part, a support element whose lengthwise axis runs at an angle to the lengthwise axis of the journal and can be tilted in a controlled way relative to the support element during tipping of the carrying element and the end sections of the journal and of the support element facing each other are connected to one another only by the tipping element.

22 Claims, 4 Drawing Sheets

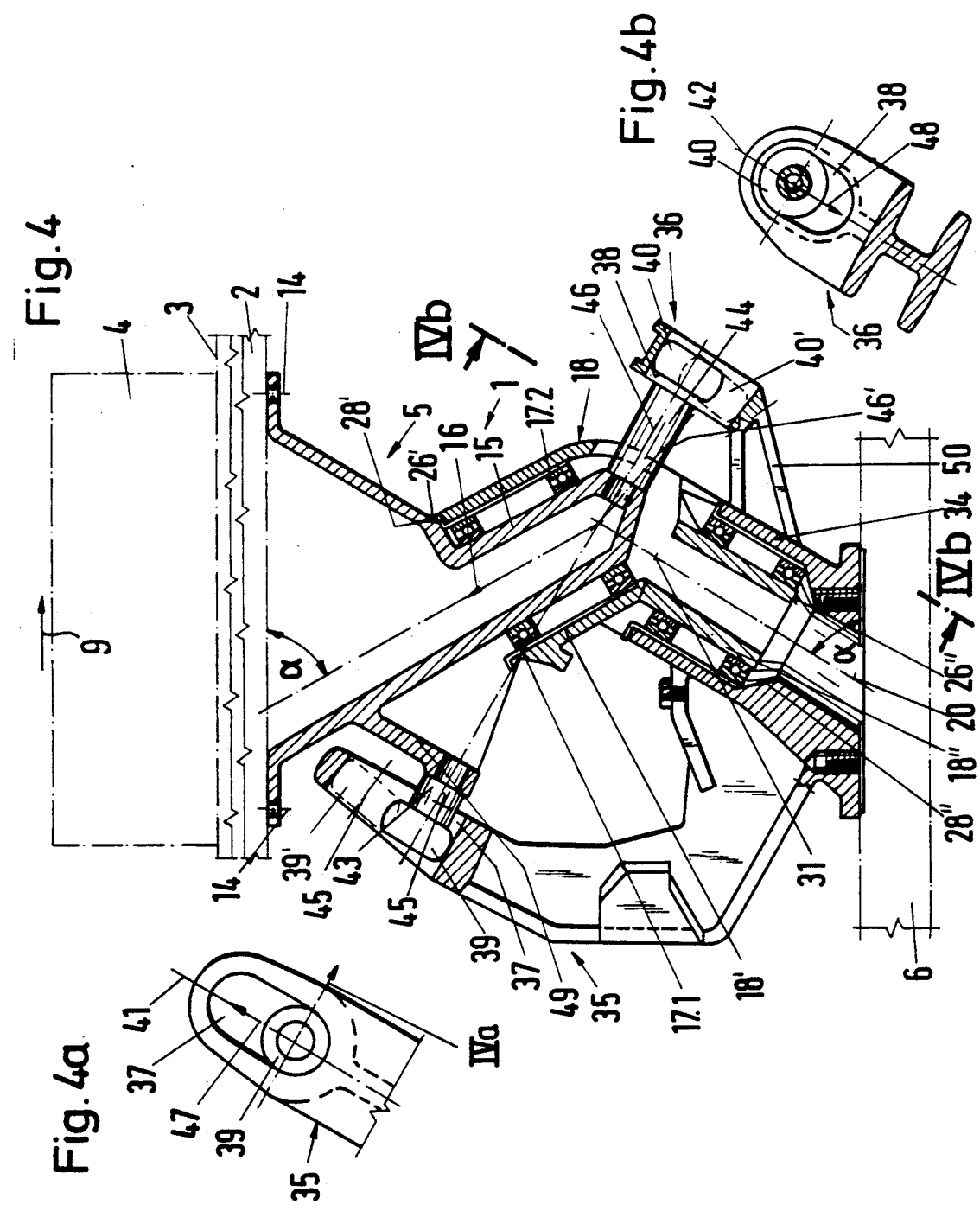

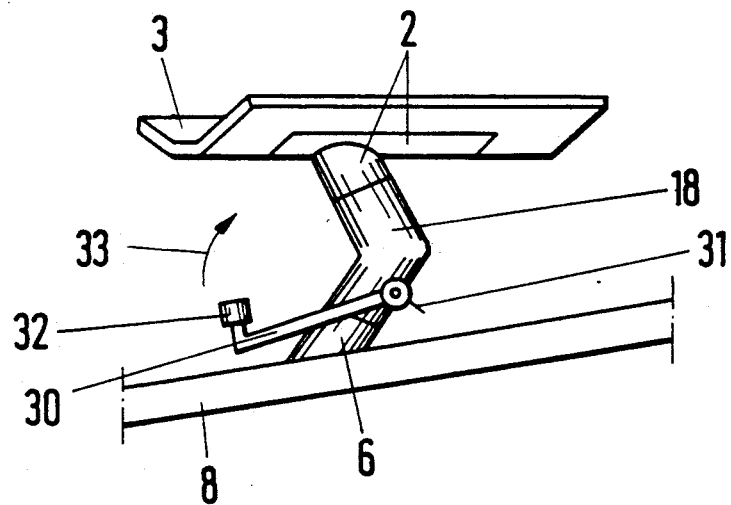
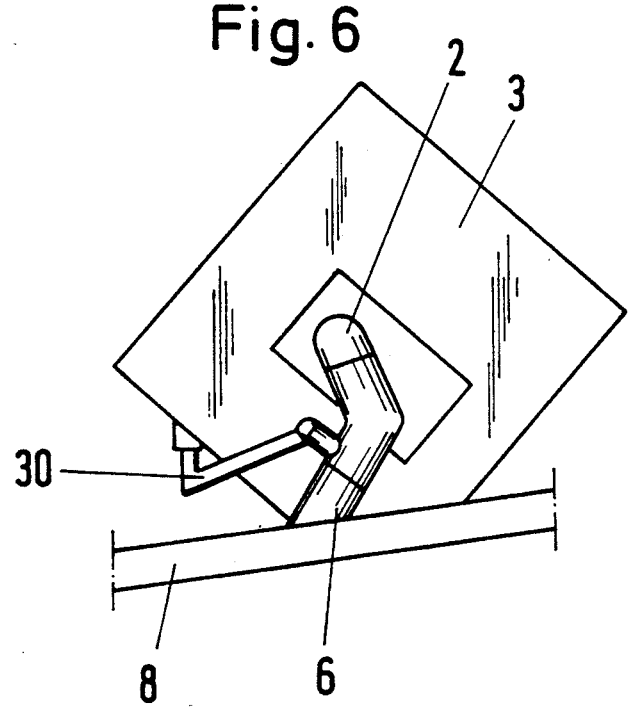

TIPPING-CONVEYOR ELEMENT FOR A PACKAGE CONVEYOR

BACKGROUND OF THE INVENTION

1. Field of the Invention

The invention relates to a tipping-conveyor element for a package conveyor, whose driven conveyor line consists of a multiplicity of conveyor elements flexibly connected to one another, elements on whose carrying surface, being essentially horizontal in the conveying state, there is to be placed in each case at least one package which, by tipping the carrying surface, is to be delivered, laterally to the conveying direction, selectively to one of several delivery stations provided along the conveying section, with a carrying element exhibiting the carrying surface, an element that is braced by a support device on a support part that is movable along a guideway, wherein the carrying element is provided with a pivoted journal placed stationary on its underside, oriented downward at an incline, and can pivot around the lengthwise axis of the journal during tipping, and the journal is supported on a tipping element which, for its part, is further mounted on a support element projecting upward from the support part, a support element whose lengthwise axis runs at an angle to the lengthwise axis of the journal and can be pivoted in a controlled way relative to the support element during tipping of the carrying element.

2. Discussion of the Background

To this package conveyor used for sorting packages, accordingly also designated a "sorter" for short, is fed the packages at least at one dispatch point (but frequently also at several dispatch points) so that the packages in each case are placed on the carrying surface, essentially horizontal in the conveying state, of a (tipping-) conveyor element.

If the above discussion or in the following text reference is made to the carrying surface of the conveyor element in the conveying state being "essentially horizontal," this is also to express that the carrying surface can optionally also be made curved, saucer-shaped or angled.

The conveyor line of such a package conveyor can run either only in a horizontal plane or also, at least in sections, inclined to the horizontal or spatially pitched, and in such cases of course care is to be taken that the packages do not unintentionally slide down from the carrying surfaces.

The essential object of such a sorter consists in delivering the packages respectively to one of several delivery stations placed laterally with respect to the conveyor belt, to sort them according to certain criteria. This can be, e.g., postal packages, for example for sorting them according to zip codes or, with a sorter used at an airport, sorting of checked-in baggage according to destination. Here, the packages, before they are dispatched to the sorter, are generally provided with a coding indication or they exhibit from the start an identification or a marking that can be read by a reading device, and the coding indication or marking in the area of the sorter is allocated to a specific delivery station and by a certain device care is taken that a package allocated to a specific delivery station is delivered to the delivery station (laterally) from the sorter and, at the delivery point involved reaches (generally by a chute) a conveyor with a conveying direction running crosswise to the conveying direction of the sorter there, from which it is then further conveyed for further processing.

To achieve the desired delivery of a package to a certain delivery station, it would evidently be basically possible, for one thing, to push a package laterally off the carrying surface (here remaining essentially horizontal) of the conveyor element involved with a ram or the like running essentially crosswise to the conveying direction of the sorter and operated hydraulically or pneumatically. But such a method of operation, especially with the high conveying speeds of sorters achieved today, which can be up to 2 m/sec. and more, is unsatisfactory if only because the package is greatly stressed during such handling. But as careful a handling as possible of the package is desired to a greatest degree practically in all individual cases for sorter applications.

Therefore, conveyor elements for such package conveyors have already been developed in which the carrying surface is to be tipped laterally at a delivery station around an axis of rotation running in the conveying direction and placed symmetrically to the carrying surface, and a central placement of the axis of rotation relative to the carrying surface is selected because generally with such a sorter the delivery stations are placed both to the left and right of the conveyor belt, so that the package (as seen in the conveying direction) accordingly can be delivered as desired to the left or right.

But this already known design has also proven to be unsatisfactory. For one thing, it has turned out that the packages, in numerous applications—especially when they are placed on the carrying surface offset laterally opposite the delivery side—tend to tumble during tipping, which is highly undesirable for a defined and especially careful delivery.

Moreover, during lateral tipping of the carrying surface in the manner described above, an elongated package that is generally placed along its lengthwise direction on a conveying element is delivered by the sorter so that its lengthwise side lies in front, so that the receiving or transfer devices must be made suitably wide or be provided with suitable steering devices, which again does not lead to careful handling of the package and, further, leads to a correspondingly high investment expense.

To improve further the conveyor elements described above, conveyor elements have also become known in which the axis of rotation running in the conveying direction is offset laterally to tip the carrying surface to the lengthwise axis of symmetry of the carrying surface. But generally such an offset cannot be achieved—especially with relatively large carrying surfaces—so that the axis of rotation lies essentially in the area of a lateral lengthwise edge of the carrying element and accordingly the carrying surface, horizontal in the conveying state, is essentially lowered only downwardly during lateral tipping, but only a relatively limited offset of the axis of rotation to the lengthwise axis of symmetry can be achieved, by which the danger of the involved package tumbling (i.e., "wobbling") cannot be sufficiently reduced.

However, since the carrying surface of a conveyor element involved here must be able to be tipped to the left or right as desired at all times for the reasons mentioned above, such a configuration to change from one axis of rotation to the other axis of rotation requires additionally a considerable expense, which entails not only corresponding costs but which, because of the relatively complicated mechanical system, is correspondingly susceptible to trouble. Further, with this known conveyor element, elongated packages are also delivered by the sorter so that their long lengthwise side lies in front, so that in this regard the drawbacks mentioned above are also present and, further, very careful handling of the package cannot be achieved.

From WO 81/01 999 there is known a conveyor element whose carrying surface is simultaneously pivoted to a limited degree during tipping so that an elongated package placed on a carrying element in the lengthwise direction suitably undergoes a certain degree of pivoting. For this purpose, the journal extending downward at an incline from the carrying element is mounted in a stationary bearing whose bearing housing is connected rigidly with the support part of the conveyor element so that during the tipping operation, a certain pivoting of the carrying surface around the stationary lengthwise axis of the journal is possible, and consequently the point of the carrying surface through which the lengthwise axis passes remains stationary.

Although the delivery operation with the conveyor elements known from this patent is improved relative to the prior art described above, a careful handling, especially of elongated packages that lie in the conveying direction on the conveyor elements, is still not nearly optimal, since the pivoting movement given to a package during tipping is very limited and, as in the prior art described above, is produced exclusively by the effect of gravity.

From DE-PS 36 02 861 there has become known a generic conveyor element that is considerably improved relative to the previously known prior art, a conveyor element with which an extremely careful delivery of the packages is guaranteed and, during the delivery operation, a package to be delivered is imparted, beyond the effect of gravity, with a course of movement which is still suitable for a careful delivery and which, relative to the previously known tipping-conveyor element described above, is achieved essentially in that the journal, during tipping of the carrying element, can be pivoted in a controlled way relative to the support element, and further preferably the lengthwise axis of the support element, in the conveying state of the carrying element, runs in mirror symmetry to the lengthwise axis of the journal relative to a horizontal reference plane running between the carrying element on the one hand and the support part on the other hand and the support element, made cone-shaped in the tipping-conveyor element according to DE-PS 36 02 861, is connected rigidly to the support part.

Further, in the tipping-conveyor element known from DE-PS 36 02 861—as in the tipping-conveyor element known from WO 81/01 999—the pivoted journal placed stationary on the underside of the carrying element and oriented downward at an incline is connected with the cone-shaped support element by a universal joint, and the one axis of rotation of the universal joint running at a right angle to the lengthwise axis of the cone-shaped support element runs in the vertical plane in which the lengthwise axes of the journal and the cone-shaped support element run in the conveying state.

The tipping-conveyor element known from DE-PS 36 02 861, which very decisively differs from the previously known prior art with respect to its structure as well as to its way of functioning, has certainly hardly proven to be in need of improvement in practice with respect to its way of functioning, but from a manufacturing engineering viewpoint, especially with respect to the universal joint placed between the journal on the one hand and the cone-shaped support element on the other hand, it creates very considerable difficulties that are system-inherent and thus cannot to be eliminated. These difficulties lie—completely apart from the very considerable costs of the universal joint, which constitute about 50% of the total costs of the entire tipping-conveyor element—especially in the tolerances to be required (and here not least again the manufacturing costs connected with them). If, namely, the tolerance in the design according to DE-PS 36 02 861 is retained in an extent or range usual for such mechanical devices and in doing so a considerable cost has already been incurred, then these tolerances "accumulate" from the area of the universal joint placed approximately centered in the tipping-conveyor element to the conveyor element or its carrying surface so that the universal joint, when grasped for example with the hands and moved "tipping" around its lengthwise and/or crosswise axis, exhibits a relatively large play which is then itself perceived as unsatisfactory by the users when it is below the threshold or limit beyond which it has a disadvantageous impact on the way the sorter functions. It has turned out that the actual or even only potential customer of such package conveyors (i.e., sorters) are not prepared, or are prepared only with extreme hesitation, to accept a structure with which the conveyor elements, in the unloaded state, can already be moved "tipping" (although of course limited) more or less in all directions by hand. This attitude is probably based on the fear that a package conveyor, whose carrying elements behave suitably already at the start of operation, in a more or less short period, because of the normal, usual wear, changes into a state in which the individual conveyor elements, because of a feared knocking out of their mounting, behave like withered flowers and in each case, in an undesired and unsystematic way, are placed laterally (although only slightly) tipped already during transport. Finally it is feared that this behavior, in the course of a relatively short operating time, could increase so far that it then also acts in a disadvantageous way on the operating behavior and that thus packages slide off the carrying surface laterally already before the set delivery point.

It can be open to question whether or not these fears in fact materialize in the foreseeable operating time, since this prejudice is held (and also completely understandably) by practically all potential users.

This skepticism at least frequently is not unjustified when the carrying surfaces of such a sorter are used for purposes other than those originally intended as a catwalk in the operating pauses. This is the case, e.g., when the operating and maintenance personnel or other third parties climb on the carrying surfaces of the conveyor elements (for example to mount lamps above the conveyor or to change lightbulbs), as is simply not preventable in practice, despite appropriate rules of conduct, especially with respect to non-employees. In such cases, such a tipping-conveyor element that is designed, for example, for a maximum load of maximally 20 or 30 kg, is suddenly loaded with, e.g., 90 kg or more (thus, threefold, fourfold or more) and then, because of these overloads, actually an even larger play can occur in the area of the carrying surface.

Because of the very considerable importance, in this connection it is again pointed out that not least, aspects relating to cost also play a very considerable role here since universal joints, as they are to be used in the tipping-conveyor elements according to WO 81/01 999 or DE-PS 36 02 861, are relatively expensive components which, in the context of the total costs of such a tipping-conveyor element, clearly play a tremendous role with a share of up to 50% and more especially considering that, with a larger sorter, usually at least hundreds of such tipping-conveyor elements are used.

SUMMARY OF THE INVENTION

Thus, the object of this invention is to improve the tipping-conveyor element of the type described above known from DE-PS 36 02 861, while avoiding its drawbacks, in particular in the sense that, while retaining the above-indicated advantages achieved from DE-PS 36 02 861 relative to the previously known prior art in this respect, the above-described drawbacks are avoided and thus there not only results a very considerably less expensive solution, but beyond that a functionally more suitable one, whose essential criteria—especially for matching to the respective circumstances or requirements of the individual case—can be varied as much as possible without leaving the basic concept.

The achievement of this object consists, according to the invention, of the fact that the end sections of the journal facing each other on the one hand, and of the support part or the support element projecting upward from the latter in the direction of the carrying surface on the other hand (while dispensing with a universal joint or the like that improves both these components in the prior art), are connected to one another only by the tipping element.

In a preferred embodiment of this invention, the support part that is movable along a guideway (made generally rail-shaped) in the tipping-conveyor element according to the invention (instead of the pivoted journal present in the object of DE-PS 36 02 861), exhibits a support sleeve that concentrically surrounds the lower end section of the tipping element, as will be explained in more detail further hereafter.

According to a greatly preferred embodiment of this invention, the support part, in lateral top view (i.e., seen as if crosswise to the vertical plane of symmetry of the tipping-conveyor element) can be made essentially in the shape of a (pivoted) E, and the middle leg of the support part can form the bearing for the lower end section of the tipping element and both outer legs of the E-shaped support part can each be (flexibly) connected to the carrying element. In the framework of the extensive development work, this greatly preferred embodiment has proven to be highly suitable, especially for an embodiment in which the middle leg of the support part that forms the bearing for the lower end section of the tipping element—as has already been explained above—is made as a support sleeve.

Both outer legs of the support part can preferably be flush with one another and the vertical, middle plane of symmetry of both outer legs of the support part here lie suitably in the vertical plane of symmetry, running in the conveying direction, of the tipping-conveyor element according to the invention.

Other preferred embodiments of this invention are described in the subclaims.

BRIEF DESCRIPTION OF THE DRAWINGS

The invention is further explained below based on embodiments with reference to the drawings. There are shown in:

FIG. 4, the tipping-conveyor element according to FIG. 3 in a section running through the vertical, middle plane of symmetry; FIGS. 4a and 4b are cross-section views through axes 45 and 46 respectively;

FIG. 5, a simplified partial representation of a tipping-conveyor element in the conveying state; and FIG. 6, a representation corresponding to FIG. 5, in which the carrying element of the tipping-conveyor element has moved into the delivery position.

DESCRIPTION OF THE PREFERRED EMBODIMENT

Figure 1:
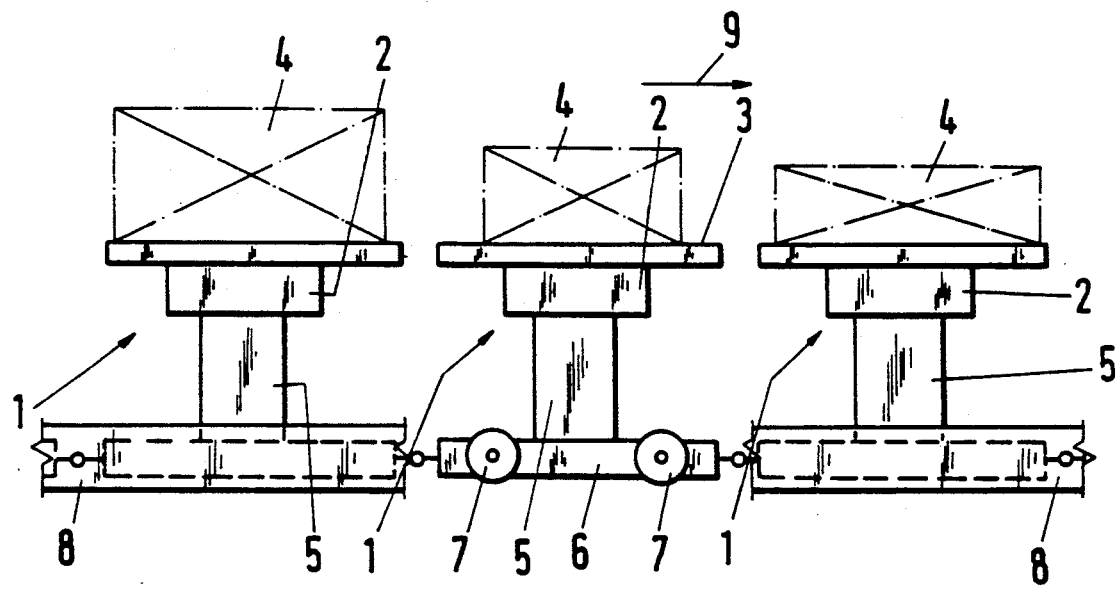
FIG. 1, a highly diagrammatic representation of a partial section of a conveyor line of a package conveyor with tipping-conveying elements in side view.
Figure 2:
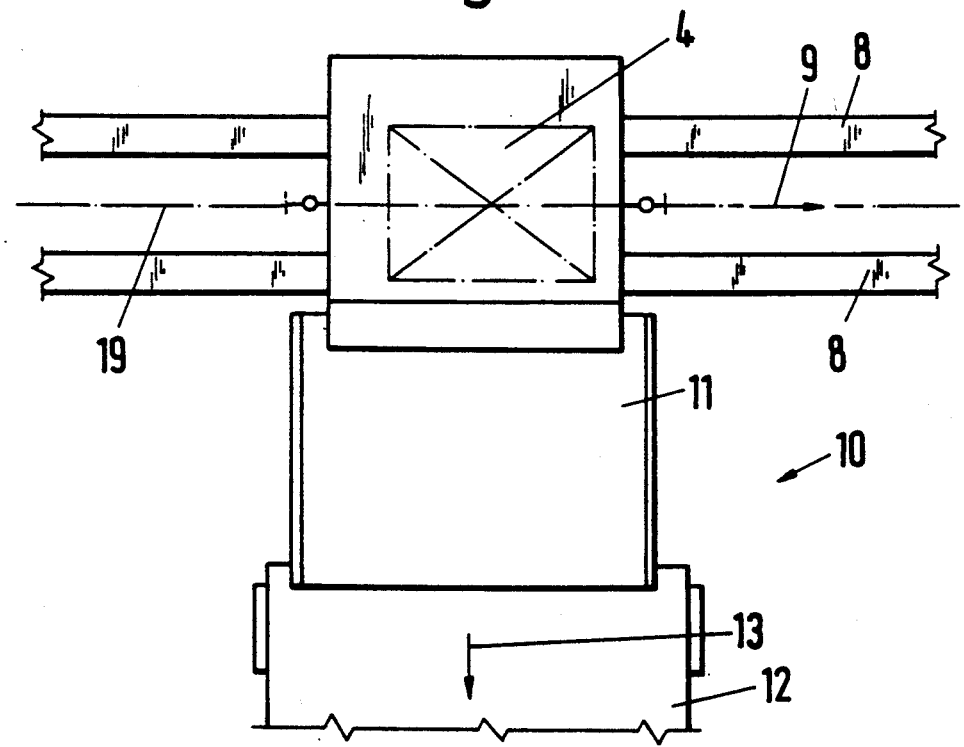
FIG. 2, a partial top view of the representation according to FIG. 1.

FIGS. 1 and 2 show, in a highly diagrammatic representation, a part of a package conveyor provided as a sorter. The sorter consists of a multiplicity of conveyor elements 1 that are each connected flexibly to one another and form a continuous conveyor line that circulates in a horizontal plane but could also run spatially pitched. Conveyor elements each consist essentially of a carrying element 2 that forms or exhibits, on its top side, a carrying surface 3 for a package 4 and is braced by a support device designated overall by reference numeral 5 on a support part 6 that can be conveyed with rollers 7 on a guideway 8 that is made as a double rail (see FIG. 2) and runs in conveying direction 9.

Packages 4 are each to be dispatched at several dispatch points, not represented in the drawing to carrying surfaces 3 of tipping-conveyor elements and by tilting (i.e., tipping) carrying surface 3, horizontal in the conveying state, to be delivered selectively, laterally to the conveying direction 9, to one of several delivery stations 10 provided along the conveyor section.

Such a delivery station 10 is represented diagrammatically in FIG. 2. Besides devices by which a delivery of a package 4 conveyed by a certain tipping-conveyor element is to be triggered, it contains a chute 11 tilted to horizontal that is placed so that a package 4 to be delivered, while sliding down from carrying surface 3 of tipping-conveyor element 1 involved, reaches chute 11 and is fed from this to a conveyor 12 of delivery station 10, which conveys package 4 away, according to arrow 13, crosswise to the conveying direction (arrow 9).

Figure 3:
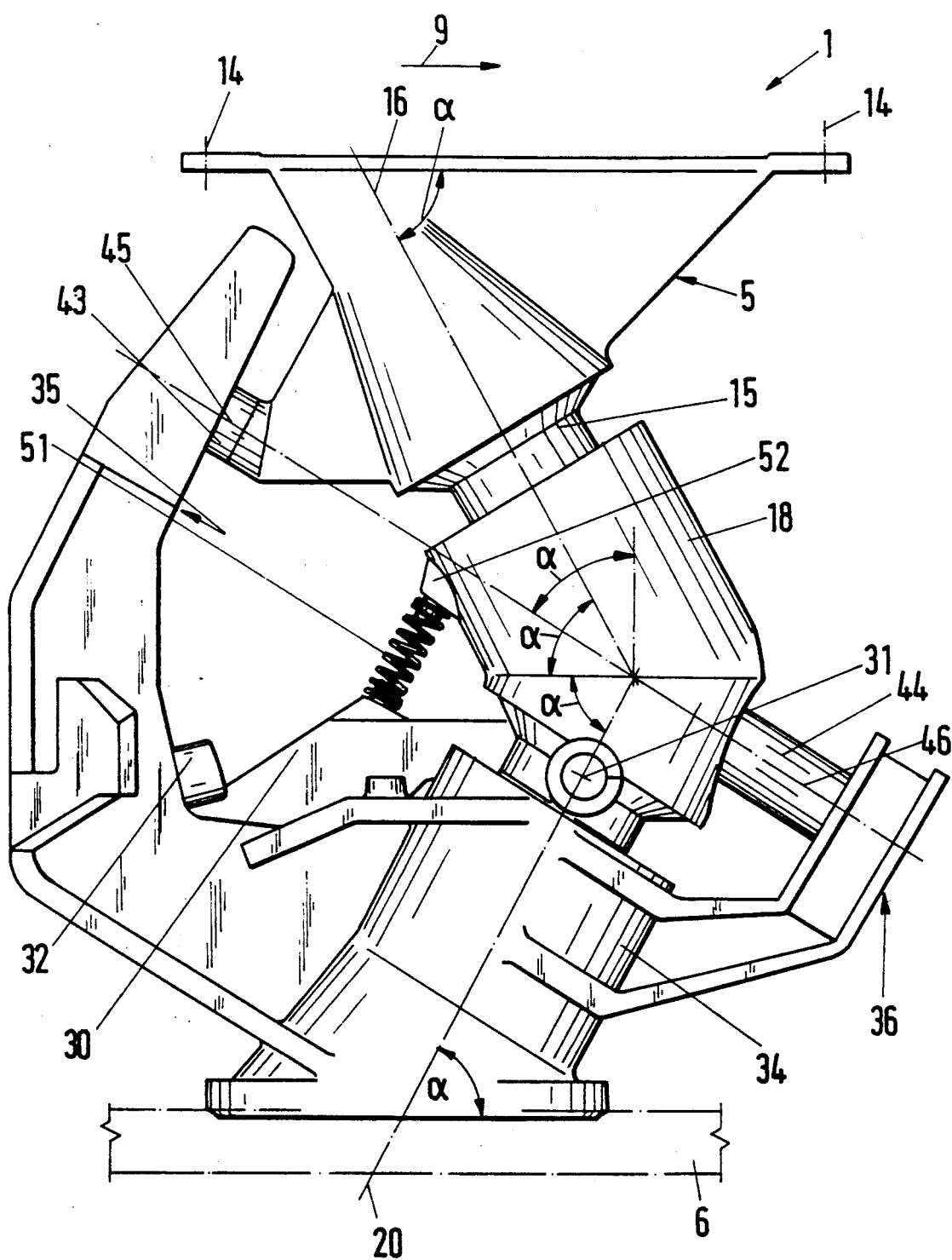
FIG. 3, a somewhat simplified side view of a tipping-conveyor element according to the invention.

FIGS. 3 and 4 show, in a lateral (partial) view that is considerably enlarged relative to FIGS. 1 and 2 (also like FIGS. 5 and 6 described further below), a tipping-conveyor element 1 whose carrying element 2 is connected by connecting means 14 (such as, e.g., screws), of which only the middle lines are represented and that are designated by reference number 14, to carrying surface 3 to brace a package 4. A journal 15 of tipping-conveyor element 1 extends downward at an incline from the underside of carrying element 2, a journal whose lengthwise axis is designated by reference number 16. Carrying element 2 connected rigidly to carrying surface 3 is pivoted, in a way described in greater detail hereinafter, by journal 15 relative to support part 6 around lengthwise axis 16 of journal 15, and specifically by two bearings 17.1 and 17.2 which in this case involve ball bearings whose inner ring is attached rigidly to journal 15 and whose outer ring is connected to a component of support device 5 straining tipping element 18, which is described further hereafter in more detail.

With an axis of symmetry 19 (see FIG. 2), running in conveying direction 9, of carrying element 2 or its carrying surface 3, lengthwise axis 16 runs in a common vertical plane (namely, in the middle vertical plane of symmetry) and forms an acute angle $\alpha$ with the section of carrying surface 3 lying in front in the conveying direction 9.

Rigidly connected to carrying element 2, journal 15 of tipping-conveyor element 1 can be pivoted in a controlled manner during the tipping of carrying element 2 around a support element (i.e., a support sleeve) 34 placed at an angle and sleeve-shaped, as is understood in further detail from the further description. Lengthwise axis 20 of support sleeve 34 runs, in the conveying state of carrying element 2—i.e., when carrying surface 3 is horizontal—in the same (datum) plane as lengthwise axis 16 of journal 15 and axis of symmetry 19 (see FIG. 2) of carrying element 2. Further, in the conveying state of carrying element 2, lengthwise axis 20 of support sleeve 34 runs, relative to a horizontal reference plane 21 running between carrying element 2 and support part 6, in mirror symmetry to lengthwise axis 16 of journal 15, and consequently angle $\alpha$ to the horizontal is equally large and is 60° in the embodiment represented.

In contrast to the embodiment according to DE-PS 36 02 861, journal 15 of tipping-conveyor element 1 is not coupled, on its tree, lower end section, (by a knuckle joint or universal joint, or optionally a ball and socket joint), to support sleeve 34 connected rigidly to support part 6, but is connected to support sleeve 34 only by tipping element 18 as well as to outer legs 35 and 36 of support part 6 that are placed at a greater distance to lengthwise axis 20 and are made integral with support part 6. As can be seen especially from FIGS. 3 and 4, support part 6, in a new lateral to a top view, is in fact made in the shape of an E whose geometric leg is pivoted by angle $\alpha$ from the vertical, and angle $\alpha$ is that (acute) angle at which lengthwise axes 15 and 20 each run in mirror symmetry to the horizontal. Here, the middle leg of E-shaped support part 6 forms support sleeve 34 and thus the bearing for lower end section 18" of tipping element 18, while both outer legs 35, 36 of E-shaped support sleeve 34 are connected movably to carrying element 2.

Both outer legs 35, 36 of support part 6 are flush with one another in a vertical plane, and specifically in the vertical plane of symmetry of tipping-conveyor element 1. They each exhibit, on their upper end section, a recess 37 or 38 (see especially FIGS. 4a and 4b) in which a guide cam 39 or 40 of support device 5 or of carrying element 2 is guided in each case. Recesses 37, 38 of outer legs 35, 36 are made as slots whose lengthwise axis 41 or 42 lies in the vertical plane of symmetry. Guide cams 39, 40 are made as rollers each with an elastic casing so that, with a relative movement of guide cams 39, 40 in recesses 37, 38, practically no noises are produced and, further, also the tolerance questions are effortlessly overcome in this way because of the elasticity thereof.

Guide cams 39, 40, made more as rollers, are each placed on a guide cam holder 43 or 44 that is rigidly connected to support device 5 or carrying element 2, and axes 45 or 46 forming the center line of guide cams 39, 40 are flush with one another and guide cam axes 45, 46 lie clearly in the vertical plane of symmetry. Although guide cam holders 43, 44 belong functionally to support device 5 or carrying element 2 and consequently could functionally be made integral with the latter, they are made, as can be seen especially from FIG. 4, as disk 43 or sleeve 44, to make assembly easier or to make it possible at all.

From the explanations above as well as especially from FIGS. 3 and 4, that tipping element 18 in each case is immovable in the lengthwise direction of lengthwise axes 16 or 20 (axially) but it can of course be pivoted as a whole, to introduce and perform the tipping movement at a delivery station 10, as will be further explained.

Tipping element 18 is recognizably made as a V-shaped tube body whose upper leg 18' runs concentrically to journal 15 and thus its lengthwise axis 16 and its lower leg 18" run concentrically to lengthwise axis 20 of support sleeve 34, but upper leg 18' does not surround the latter concentrically, as is the case in the embodiment according to DE-PS 36 02 861, but acts just like a journal relative to support sleeve 34, as can be seen especially from the representation in the lower part of FIG. 4.

Both front faces 26' or 26" of tipping element 18, each running at a right angle to lengthwise axis 16 or 20 involved, lie opposite a parallel surface 28' or 28" of carrying element 2 or of support sleeve 34, and tipping element 18 consequently is at least essentially sealed to carrying element 2 and also to support sleeve 34.

In the conveying state represented in FIGS. 1 to 5, tipping element 18 is locked against rotation on support part 6 by a locking means not represented in detail in the drawing. Since tipping element 18, in the locked state, cannot pivot around lengthwise axis 20 of support sleeve 34, carrying element 2 is consequently also locked.

The locking means of tipping-conveyor element not represented in detail in the drawing, can be unlocked by an unlocking means placed at each delivery station 10 and can be actuated in a controlled manner. Such an unlocking can be performed, for example, by a lever 30 which is coupled to tipping element 18 according to FIGS. 5 and 6 at an axis of rotation 31, a lever which, with its laterally projecting, free end, to which a roller 32 can suitably be attached, travels up an incline at that delivery station 10 at which conveyor element 4 is to deliver package 4 transported by it and is pivoted upward around axis of rotation 31 in the direction of arrow 33, causing lever 30 to act on locking means 29 and unlocking it. Since it is possible to empty tipping-conveyor element 1 on both sides, of course a suitable lever 30 or a component is placed on each side that is to be actuated on both sides of the conveyor section at a delivery station 10 to unlock the unlocking means.

During the tipping initiated at a delivery station 10, a tipping during which a control element of delivery station 10 acts in a suitable manner on the one roller 32 of lever 30 so that the latter is pivoted around horizontally running axis 31, tipping element 18 is unlocked and pivoted, the position of support part 6, guided in generally rail-shaped guideway 8, evidently does not change relative to guideway 8—apart from the forward movement in conveying direction 9. In contrast, pivoting of tipping element 18 around lengthwise axis 20 causes a pivoting-tipping movement of carrying element 2 and pivots its carrying surface 3 into the final position represented diagrammatically in FIG. 6, but the emptying final position according to FIG. 6 corresponds to an actuation of lever 30, not represented in FIGS. 5 and 6, placed on the other side of tipping element 18, at a delivery station 10, while an actuation of lever 30 represented in FIGS. 5 and 6 would cause a pivoting-tipping to the other side.

With this pivoting-tipping movement of carrying element 2 or its carrying surface 3 out of the horizontal conveying position according to FIGS. 1 to 5, there occurs a pivoting of carrying surface 3 around lengthwise axis 16. Further, journal 15 (and thus carrying element 2 with its carrying surface 3) is pivoted in a controlled way relative to support element 34, resulting overall in a geometrically somewhat complicated movement of a carrying surface of carrying element 2 that supports a package 4, a movement with which carrying surface 3 is brought to the delivery point in an inclined position, but here simultaneously is lowered according to its center point and is moved forward during the rotation, so that carrying surface 3 first still accompanies package 4 during the delivery while imparting a suitable acceleration and package 4 is transferred in an extremely careful manner to downstream chute 11 (see FIG. 2).

With this pivoting-tipping movement transmitted by a roller 32 and levers 30 to tipping element 18 and consequently imparted by tipping element 18 to carrying element 2, there further occurs at the same time a pivoting of axes 45-46 (see FIG. 4) in a clockwise direction, and roller-shaped guide cam 39 is moved upward at an incline, according to drawn-in a arrow 47 in FIG. 4a, in recess 37, made as a slot, of outer leg 35 of support part 6 and, correspondingly, guide cam 40 is moved downward at an incline according to arrow 48 (see FIG. 4b) in the recess 38 of outer leg 36 that is allocated to guide cam 40 and also made as a slot.

Despite dispensing with a drive connection between journal 15 and support sleeve 34 (by a universal joint or the like) explained herebefore (also with respect to the reasons) and the technical difficulties and economical (namely having to do with cost) drawbacks thus avoided, with the embodiment of tipping-conveyor element 1 according to the invention there can be achieved not only a rotation-tipping movement of the kind described above that is qualitatively basically achieved already with the tipping-conveyor element according to DE-PS 36 02 861, but with tipping-conveyor element 1 according to the invention this movement can even be optimized, so that, in addition to the further advantages already indicated above of this invention, a careful delivery of packages 4 at delivery stations 10 can be achieved such as was never before deemed possible either by manufacturers or users.

Let it be added that, for better clarification of the structure and way of functioning in FIG. 4, the pivoting position relative to guide cams 39, 40 and their lengthwise axes 41 or 42 has been indicated with dash-dot lines, and the corresponding references have each been designated with a "'''".

By the above-described accompanying movement of carrying surface 3 during delivery of a package 4 and the movements or forces thus imparted to package 4, there also occurs at the same time steering of the lengthwise axis of package 4 running first on tipping-conveyor element 1 in conveying direction 9, which is highly advantageous especially for elongated packages, since in this way these are pivoted already relative to their spatial orientation and consequently are practically threaded through the delivery station in the receiving direction in a favorable manner.

Despite the very considerable advantages of the described tipping-conveyor element 1 according to this invention, the latter can clearly be made with a relatively few, simple and robust components, and the manufacturing costs of such a tipping-conveyor element 1, relative to an embodiment according to DE-PS 36 02 861, can be reduced by about 50% and here—as explained—no drawbacks need be accepted, but even still further advantageous effects can be achieved, so that overall, according to the invention, a tipping-conveyor element was provided that takes into account not only the conveying engineering requirements—including extremely careful handling of packages 4—in an outstanding way, but overall, in an engineering as well as in an economic way, takes all requirements into account.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A tipping-conveyor element for a package conveyor whose driven conveyor line has a multiplicity of conveyor elements flexibly connected to one another, wherein at least one of said elements comprises:

a carrying surface, essentially horizontal in a conveying state, upon which is respectively positioned a package which, by tipping of the carrying surface, is delivered, laterally to the conveying direction, selectively to one of a plurality of delivery stations provided along the conveyor line;

a carrying element having the carrying surface positioned thereon, said carrying element including a support device positioned on a support part that is movable along a guideway, wherein the carrying element includes a pivoted journal placed stationarily on an underside portion thereof, oriented downward at an inclined angle, and pivotable around the lengthwise axis of the journal during tipping; and a support element which projects upward from the support part; and a tipping element wherein the journal is supported on the tipping element and the tipping element is mounted on the support element wherein the support element has a lengthwise axis which runs at an angle to the lengthwise axis of the journal and includes means for being tilted in a controlled manner relative to the support element during tipping of the carrying element wherein end sections of journal and support element face each other and are connected to one another only by the tipping element; and axially spaced first and second bearing elements wherein an end section of the journal is supported against an upper leg of the tipping element by the first and second axially spaced bearings.

2. Tipping-conveyor element according to claim 1, wherein the support element includes a support sleeve and wherein said support sleeve concentrically surrounds a lower end section of the tipping element and supports said lower end section by third and fourth axially spaced bearings for distributing supporting forces.

3. Tipping-conveyor element according to claim 1, wherein the support element has first and second legs which, in combination with the support element are substantially in the shape of an E and wherein the support element forms a bearing portion for a lower end section of the tipping element, and the legs of the support element are connected to the carrying element.

4. Tipping-conveyor element according to claim 2, wherein the support element comprises a support sleeve.

5. Tipping-conveyor element according to claim 3, wherein the legs of support part are flush with one another and wherein a vertical, middle plane of symmetry of the outer legs of the support element part lie in a vertical plane of symmetry running in a conveying direction.

6. Tipping-conveyor element according to claim 5, wherein the legs each include, on an upper end section thereof, a recess and which comprises a guide cam of one of the support device and the carrying element is guided in each said recess.

7. Tipping-conveyor element according to claim 6, wherein the recesses of the legs of the support element include slots having lengthwise axes which lie in a vertical plane of symmetry.

8. Tipping-conveyor element according to claim 6 wherein the guide cams comprise rollers.

9. Tipping-conveyor element according to claim 8, wherein the guide cams have an elastic casing.

10. Tipping-conveyor element according to claim 9, wherein the guide cams are each placed on a guide cam holder that is connected to one of the support device and the carrying element; and wherein axes of the guide cams that form the center line of the guide cams are flush with one another.

11. Tipping-conveyor element according to claim 10, wherein the guide cam axes lie in the vertical plane of symmetry.

12. Tipping-conveyor element according to claim 10, wherein the guide cam holders each comprise one of a disk and a sleeve and are attached with an attachment section of the support device and one of the carrying element and an attachment section of one of the support part and the support sleeve.

13. Tipping-conveyor element according to claim 1, wherein the tipping element is immovably positioned in the lengthwise direction of both lengthwise axes.

14. Tipping-conveyor element according to claim 13, wherein the tipping element comprises a V-shaped tube body having a first leg placed concentrically with respect one of the journal and the lengthwise axis of the journal and a second leg which runs concentrically to the lengthwise axis of the support sleeve (34).

15. Tipping-conveyor element according to claim 14, wherein first and second front faces of the tipping element each run at right angles to the lengthwise axis of the legs, respectively, of the tipping element, and each lie opposite an essentially parallel surface of one of the carrying element and the support sleeve.

16. Tipping-conveyor element according to claim 15, wherein the tipping element is sealed with respect to the carrying element and one of the support part and the support sleeve.

17. Tipping-conveyor element according to claim 16 wherein the tipping element, in a conveying state, is locked by detachable locking means on the support part and wherein the locking means is unlockable by unlocking means positioned at a delivery station which is actuable in a controlled manner.

18. Tipping-conveyor element according to claim 17, which comprises an actuation means placed at at least one delivery station (10) which is rotatable around the lengthwise axis of the support sleeve for tipping said tipping means.

19. Tipping-conveyor element according to claim 17, which comprises at least one lever located on the tipping element which is swivelable with a delivery station during unlocking of the unlocking means, around a coupling point, while the rotating tipping element is rotated around the lengthwise axis of sleeve-shaped support element.

20. Tipping-conveyor element according to claim 19, which comprises at least one spring located between the lever and the tipping element which, when the lever is moved out of its locking position, exerts a restoring force on lever.

21. Tipping-conveyor element according to claim 20, wherein the at least one spring comprises a coil spring held with end sections thereof on one of an attachment of the tipping element and an attachment of the lever.

22. Tipping-conveyor element according to claim 1, wherein the lengthwise axis of the journal is located relative to the carrying element so as to be offset in the direction of the lengthwise axis of symmetry of the carrying surface to the crosswise axis of symmetry of carrying surface.

* * * * *